Sept. 16, 1924.　　　　　　　　　　　　　　　　　　　　1,508,710
P. O. NOBLE
ELECTRIC ARC WELDING SYSTEM AND APPARATUS
Filed April 26, 1920　　　2 Sheets-Sheet 1
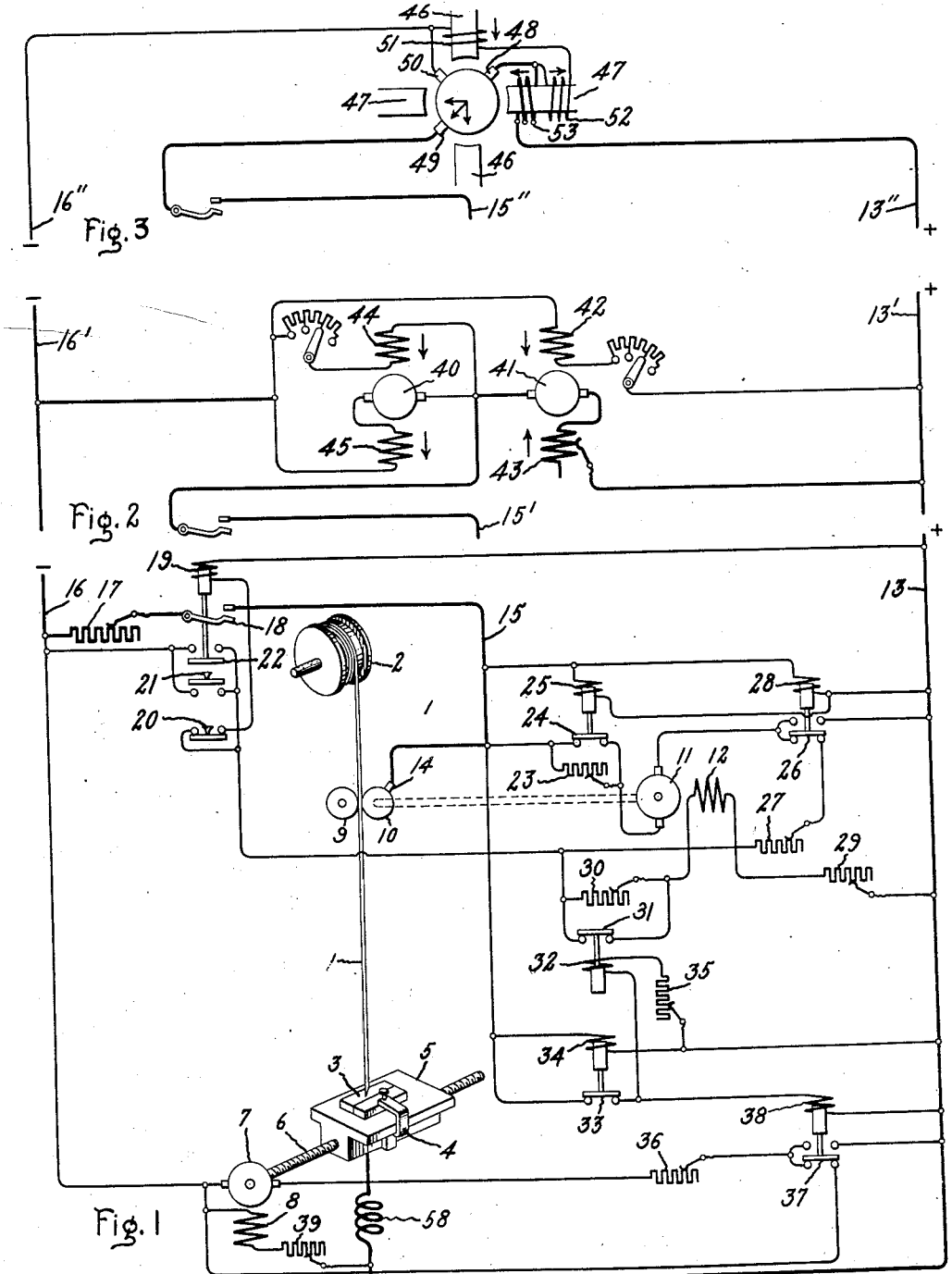
Inventor:
Paul O. Noble,
by Albert G. Davis
His Attorney.

Sept. 16, 1924.  
P. O. NOBLE  
1,508,710  
ELECTRIC ARC WELDING SYSTEM AND APPARATUS  
Filed April 26, 1920  2 Sheets-Sheet 2

Inventor:  
Paul O. Noble,  
by Albert G. Davis  
His Attorney.

Patented Sept. 16, 1924.

1,508,710

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ELECTRIC ARC-WELDING SYSTEM AND APPARATUS.

Application filed April 26, 1920. Serial No. 376,448.

*To all whom it may concern:*

Be it known that I, PAUL O. NOBLE, a citizen of the United States, residing at Schenectady, in the county of Schenectady, State of New York, have invented certain new and useful Improvements in Electric Arc-Welding Systems and Apparatus, of which the following is a specification.

My invention relates to electric arc welding and one of its objects is to provide an improved apparatus by which automatic metallic arc welding may be economically practiced on articles varying greatly in size and shape, whereby the apparatus takes on a more or less universal character, thus greatly increasing its utility.

A further object of my invention is to provide an arc welding control system that is adapted to be connected without change for operation from different types of supply circuits.

A further object of my invention is to provide simple and reliable means for automatically and positively actuating the welding electrode to strike the arc.

A further object of my invention is to provide improved means for controlling the relative motion of traverse between the work and the electrode in response to the electrical condition of the welding arc, whereby the action of the apparatus is rendered entirely automatic.

My invention will be better understood from the following description taken in connection with the accompanying drawings and its scope will be pointed out in the appended claims.

Figure 4:
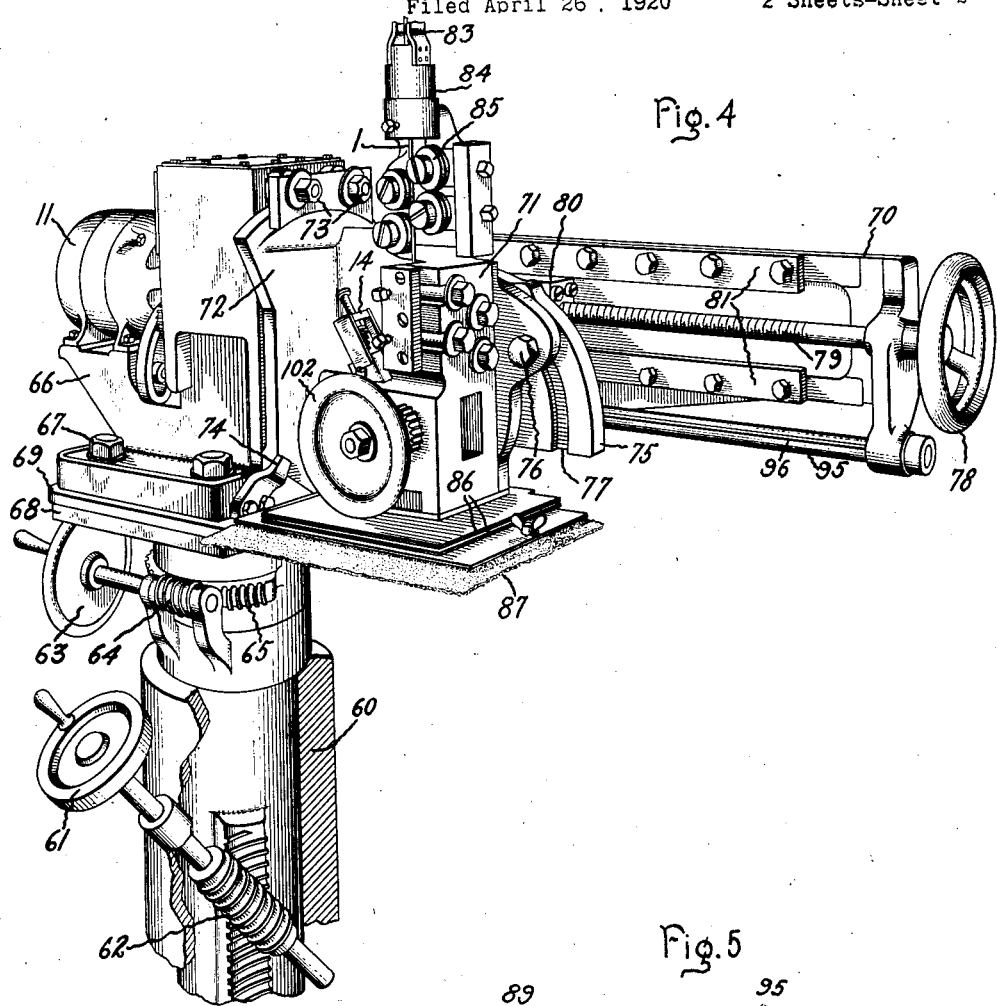
Figure 5:
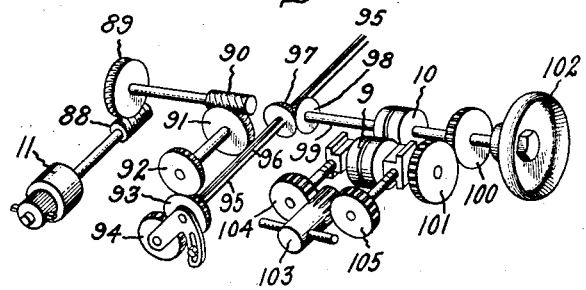
Figure 6:
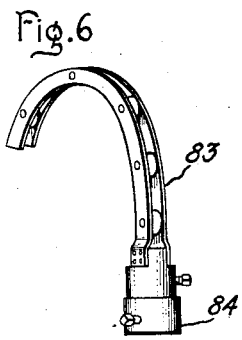

In the accompanying drawings, Fig. 1 diagrammatically represents one embodiment of my invention in which an electric motor is arranged to traverse the work with respect to the welding electrode and in which an electric motor is arranged automatically to actuate the welding electrode to draw or strike the welding arc and to feed the electrode to the work at a rate varying with variations of the voltage at the arc; Figs. 2 and 3 represent types of supply circuits which may be used instead of the type shown in Fig. 1; Fig. 4 represents a practical embodiment of my preferred form of apparatus for feeding the welding electrode to the work; Fig. 5 is a schematic representation of the means used in the apparatus of Fig. 4 for transmitting motion to the electrode feed rolls; and Fig. 6 shows means used for guiding the electrode to the welding head.

Referring to Fig. 1, the welding electrode, 1, shown in this case as a flexible wire of iron or steel, is fed from a reel 2 to a welding arc playing between the electrode 1 and the work 3, which may consist, for example, of two plates to be welded together along their edges. The work is suitably held, for example, by means of one or more clamps 4 (one only being shown) upon a table 5. The table 5 is arranged to be traversed in the direction of the seam to be welded in any suitable manner. In this case the traversing mechanism comprises a threaded shaft 6 driven by motor 7 provided with a field winding 8. The electrode 1 is moved forward as it melts at a rate adapted to maintain the welding arc at substantially constant length. The means indicated for moving the welding electrode comprises two guiding and feeding rolls 9 and 10 driven through suitable speed reducing gearing (not shown in Fig. 1) from an electric motor 11, having a field winding 12. The work is directly connected to positive main 13 and the current is fed to the electrode 1 by means of a brush 14 bearing on roll 10 and connected to main 15. Mains 13 and 15, in the arrangement shown, carry direct current of a suitable characteristic for welding. Preferably the voltage across mains 13 and 15 will vary inversely with respect to current changes in such a manner as to maintain the energy at the arc approximately constant. In the arrangement shown in Fig. 1, the main 15 is connected to the negative supply main 16 through an adjustable regulating resistance 17 and contactor 18. The voltage of the mains 13 and 16 being constant, the resistance 17 will act to reduce the voltage at the arc with increases in welding current. The contactor 18 is arranged to be closed by coil 19 controlled by push buttons 20 and 21. An interlock contact 22 is arranged to be closed simultaneously with the contactor 18 and this contact 22 is arranged to short circuit push button 21 to provide a holding circuit for coil 19.

One terminal of motor 11 is connected through resistor 23 to main 15 and thereby to the welding electrode 1. A contactor 24, controlled by coil 25, is arranged to short circuit resistor 23 in its closed position. The other terminal of motor 11 is arranged to be connected by a double throw contactor 26 either directly to positive main 13 or through an adjustable resistor 27 to negative main 16. Contactor 26 is controlled by a coil 28. Coils 25 and 28 are connected in parallel across mains 13 and 15 and therefore respond to the arc voltage. Coil 25 will be adjusted to insert resistor 23 in the circuit of armature 11 whenever the arc voltage is abnormally high. For example, where the open circuit voltage is 60 volts, coil 25 may be arranged to operate at about 40 volts. Coil 28 will be arranged to hold its core in the upper position whenever the arc voltage is sufficient for welding. The resistor 23 is provided as a protective means for the armature of the motor 11, which is designed to operate normally with an impressed voltage of from 10 to 18 volts. The field winding 12 of motor 11 is, during normal operation, connected across the mains 13 and 16 through an adjustable resistor 29.

A vibratory regulator comprising an adjustable resistor 30 and a contact 31, controlled by coil 32, is arranged to vary the field strength of the electrode feed motor in accordance with variations in voltage across the welding arc. To accomplish this function, the coil 32 is connected across the welding circuit 13, 15. A contact 33, controlled by a coil 34, is arranged in circuit with coil 32 to interrupt the circuit of this coil whenever the arc voltage is abnormally high. During normal operation, coil 32 vibrates rapidly to control the effective resistance of resistor 30, and thereby the speed of motor 11, in a manner well known to those skilled in the art of vibratory regulators. An adjustable resistor 35 is arranged in the circuit of coil 32 to permit of adjusting the voltage at the welding arc.

The purpose of the double throw contactor 26 is to reverse the electrode feed motor 11 to strike the arc, as will be hereinafter set forth in connection with the description of the operation of the device. It may be here briefly stated that, when the contactor 26 is in its upper position, motor 11 is connected across the welding circuit 13, 15 for operation in one direction, but when contactor 26 is in its lower position, motor 11 is connected across mains 15 and 16 for reverse operation.

One terminal of the traversing motor 7 is connected to main 16 and the other terminal of this motor is connected through an adjustable resistor 36 to a double throw contactor 37, controlled by a coil 38, connected across the welding circuit 13, 15 through contact 33. Coil 38 is arranged to move its armature to the upper position and hold it there whenever the arc voltage is sufficient for normal welding. In this position of the contactor 38, the traversing motor 7 is connected across constant potential mains 13, 16 and operates to traverse the work with respect to the welding electrode at any desired rate determined by the motor field strength, which may be adjusted by the resistor 39. Whenever the arc voltage is abnormally high, coil 34 opens contact 33, deenergizing coil 38, causing contactor 37 to move to its lower position, in which it disconnects the armature of motor 7 from the main circuit and short circuits the same through resistor 36, thereby dynamically braking motor 7. Furthermore, if at any time the welding voltage falls below that sufficient for welding, as, for example, whenever the arc is short circuited coil 38 will release its armature to establish the dynamic braking circuit referred to. As thus arranged, it is apparent that the traversing motor is started whenever the arc voltage is proper for welding and instantly stopped whenever the arc either goes out or is short circuited.

The operation of the arrangement shown in Fig. 1 is as follows: Assuming that the supply mains 13 and 16 are energized, the operator, to begin welding, merely closes push buttom 21 to complete a circuit from line 13 through coil 19 of contactor 18 and push buttons 20 and 21 to line 16. Contactor 18 closes impressing the full voltage of mains 13 and 16 upon the welding circuit 13, 15. Contactor 18, in closing, closes interlock contact 22 which completes a shunt around push button 21, which may, therefore, be opened without deenergizing coil 19. The voltage now impressed on the welding circuit 13, 15 causes coils 25, 28 and 34 to move contacts 24, 26 and 33 to the upper position. The operation of contact 24 inserts protective resistor 23 into circuit with the armature of motor 11. The opening of contact 33 leaves coil 38 deenergized and consequently motor 7 remains inoperative. Contact 26 being in its upper position completes a circuit from positive main 13 through motor armature 11 and resistor 23 to line 15. The full voltage of the mains 13, 16 is thus applied to motor armature 11 and resistor 23 in series and the connections are such that the motor is operated in a direction to feed the electrode 1 toward the work 3 by means of the feed rolls 9 and 10. At this time the field 12 of the electrode feed motor is strongly energized, since resistor 30 is short circuited by contact 31, coil 32 being open circuited at contact 33. Motor 11, therefore, operates slowly to feed the electrode 1 toward the work and at the moment of engagement between the electrode and the work, the welding circuit 13, 15 is short circuited. The resistance 17 acts to limit the short circuit current and practically the full voltage of the mains 13, 16 appears as a voltage drop across this resistance. The voltage of the welding circuit 13, 15 being practically zero, coils 25, 28 and 34 are deenergized and contacts 24, 26 and 33 move to their lower positions. While the closing of contact 33 completes the circuit of coil 38, contact 37 is not moved from its position, rendering the traversing motor 7 inoperative, because of the fact that the voltage of the welding circuit 13, 15 is at this time too low to energize coil 38. The movement of contact 26 to its lower position completes a circuit through motor armature 11 from line 15 through contact 24 (which now short circuits resistor 23) armature 11, contact 26, resistor 27 and contact 22 to line 16. The voltage impressed across motor armature 11 is equal to the voltage drop across resistance 17, and, as heretofore pointed out, is practically equal to the voltage of mains 13, 16. The motor 11 is in reality connected in series with the welding electrodes to constant voltage mains 13, 16. Resistor 27 at this time protects the motor armature 11 from the excessive voltage drop across resistance 17. This circuit reversing arrangement for the electrode feed motor 11 has the advantage of making it possible, by means of resistor 27, to adjust the backing away speed of the motor to any desired value independent of the forward speed of the motor. I arrange the feed rolls to engage the electrode positively so that there is no chance of the rolls slipping on the electrode. This may be accomplished by setting the feed rolls to grip the electrode tightly. If desired the feed rolls may be knurled. Since the operation of the voltage responsive relays is very quick and since the speed at which the electrode is moved in either direction is accurately determined, I am enabled to arrange the feed motor in positive driving relation to the electrode, which arrangement insures that the electrode shall be broken away even if it occasionally tends to stick or weld to the work. Motor 11 is, in this manner, reversed to withdraw the electrode 1 from the work 3 and strike the welding arc. As soon as the welding arc is struck, coil 28 is energized sufficiently to move contact 26 to its upper position and reconnect motor armature 11 across the welding circuit 13, 15 for operation in a direction to feed the electrode 1 toward the work as the electrode is consumed. The voltage across the welding circuit, during normal operation, is too low to energize the coil 25 and resistor 23, therefore, remains short circuited so that the full voltage of the welding circuit is impressed across the motor armature 11. The voltage is also too low to energize coil 34 and contact 33 therefore also remains closed. Coil 38 moves contact 37 to its upper position as soon as the arc voltage reaches a welding value, thus completing a circuit from main 13 through resistor 36 to the armature of the traversing motor 7, which is thus set into operation to move the work with respect to the electrode as the welding proceeds. The field winding 8 of the traversing motor is connected across the constant potential mains 13 and 16 and the speed of this motor may be controlled by the adjustable resistor 39.

It will be obvious, to those skilled in the art, that any desired means may be utilized to insure that the weld shall follow along the seam to be welded, and that my invention is not limited in this respect. Ordinarily, the weld will be made to follow the seam by properly aligning the work, but if desired templates may be used to cause the weld to follow any desired line. It is furthermore apparent that my invention is not limited to an arrangement in which the work is traversed longitudinally only, since where it is desired to build up a shaft or flange, for example, the traversing motor may be arranged to rotate the work with reference to the electrode or simultaneously to rotate and traverse the work.

During normal welding, the coil 32 will keep the contact 31 in a continual state of vibration. If the arc voltage, for example tends to rise above the desired predetermined value, the resistor 30 will be placed in circuit with winding 12 a greater proportion of the time, thereby weakening the field of the electrode feed motor 11 and speeding it up to shorten the welding arc and reduce the arc voltage to normal. Whenever the arc voltage tends to fall below the desired predetermined value the resistor 30 will be short circuited for a greater proportion of the time and the field winding 12 strengthened to slow up the electrode feed motor and lengthen the welding arc. If, at any time, the voltage of the welding circuit falls below a value sufficient to weld, as, for example, when for some reason a short circuit is established by the electrode with the work, coil 38 will be deenergized and contact 37 will establish a dynamic braking circuit for motor armature 7 to bring the same to a sudden stop. Moreover, if at any time the welding arc should go out by reason of too long an arc having been drawn, coil 34 would be energized to open the circuit of coil 38 at contact 33 and thus bring the motor 7 to a sudden stop in this case also. By the use of a reactance 58, the tendency of the arc to break or go out may be effectively prevented. The operation of the apparatus may be stopped at any time merely by opening push button 20.

From the preceding description of the operation of the arrangement shown in Fig. 1, it will be noted that the welding arc is automatically struck and thereafter maintained at a constant length, and that the traversing motor for causing relative motion between the work and the electrode is started and stopped in accordance with the electrical condition of the welding arc. While I have represented the traversing motor as an electric motor, it is obvious that the combination which I have invented is not in its broadest aspect limited to any particular kind of motive power for the traversing motor. It will be obvious to those skilled in the art how the automatic control for the traversing motor herein described may be applied to the control of motors other than electric motors.

The feature of controlling the rate of electrode feed in accordance with the voltage at the arc, for example, the arc voltage as here described, is disclosed and claimed broadly in my copending application, serial No. 323,170, filed September 11, 1919, for methods and apparatus for electric arc welding.

It will be observed that the welding circuit and the control circuits of Fig. 1 are all supplied from three mains 13, 15 and 16, the voltage across one pair of these mains 13, 16 being substantially constant, while the potential of main 15, with reference to the potential of mains 13 and 16 is variable, the voltage between the welding mains 13 and 15 varying inversely with the welding current and the voltage between mains 15 and 16 varying inversely with the voltage of the welding mains 13 and 15. By arranging the circuits in this manner, I am enabled to connect the welding system to any one of several standard types of supply circuits for arc welding without changing the internal connections of the apparatus, thus increasing the general utility of the apparatus.

In Fig. 2 I have represented a welding supply circuit of the balancer type, which arrangement forms the subject matter of my Patent No. 1,310,131, granted July 15, 1919. The mains 13', 15', 16' of Fig. 2 correspond exactly to the mains 13, 15 and 16 of Fig. 1 and the arrangement of Fig. 2 may, therefore, be bodily substituted for the type of supply circuit of Fig. 1, which comprises constant potential mains and a series regulating resistance. The balancer set comprises a motor 40 and a generator 41 connected in series across mains 13', 16'. The generator is provided with a constantly energized field winding 42 and an adjustable series differential winding 43. The motor is provided with a field winding 44 connected in shunt to the armature 40 and a series cumulative field winding 45. As thus arranged, the current taken by the motor armature 40 is practically constant but the voltage across the armature 40 varies inversely with changes in voltage of the generator armature 41 and the welding circuit 13', 15' is thereby regulated so that the energy of the welding circuit is approximately constant. The welding current and the energy of the welding circuit may be adjusted to any desired value by varying the strength of the differential field winding 43.

Fig. 3 shows an inherently regulated generator which is adapted to supply mains 13" and 16" at constant voltage and furnish a voltage varying inversely with the current to mains 13" and 15". It is apparent that the generator of Fig. 3 may be bodily connected to the welding and control circuits of Fig. 1. The generator shown in Fig. 3 is a constant speed machine, one pair of poles 46 of which are arranged to be saturated and the other pair of poles 47 of which are unsaturated during the normal operation of the machine. The armature is provided with a pair of main brushes 48 and 49 and an auxiliary brush 50. The arrangement is such that the voltage between brushes 48 and 50 is produced by saturated poles 46 only, while the voltage between brushes 48 and 49, which are connected to the welding circuit, is produced by the flux in both the saturated and unsaturated poles. It is apparent that the voltage between brushes 48 and 50 and therefore the voltage between the mains 13" and 16" is constant. Exciting windings 51 and 52, supplied from the constant voltage brushes 48 and 50, are arranged upon the field poles 46 and 47 respectively, and the direction of winding is such that the magnetomotive forces of these windings tend to produce fluxes and E. M. F.'s in the same direction between brushes 48 and 49. An adjustable differential series winding 53, carrying welding current, is arranged upon poles 47. The armature reaction of the generator is arranged, so that the component thereof, in line with poles 47, assists the winding 53 and so that the component thereof in line with poles 46 assists the winding 51. It is apparent that variations in the welding current have little effect upon the fluxes in the line of poles 46, as thus arranged, since these poles are saturated during normal operation, and it is apparent that variations in the welding current have a very marked effect upon the fluxes in the line of poles 47, since these poles are always undersaturated. The windings are preferably so arranged that with no current flowing in the welding circuit 13", 15", the voltage at the brushes 48 and 49 will be that necessary for striking the arc, and so that at a certain value of load current, preferably about half load, the resultant flux in the poles 47 is zero. At such a load, the voltage between the brushes 48 and 49 is equal to the voltage between the brushes 48 and 50. When the welding current increases above this value, the flux in poles 47 builds up in the opposite direction, so that the voltage between brushes 49 and 50 increases, but with opposite polarity to that between brushes 48 and 50. Therefore, the voltage between brushes 48 and 49 is equal to the voltage between brushes 48 and 50 less the voltage between brushes 49 and 50. When the welding circuit is short circuited, the voltage between brushes 49 and 50 is substantially equal to the voltage between brushes 48 and 50 and opposed thereto. It is thus seen that the voltage between welding circuit brushes 48 and 49 is the algebraic sum of the voltages between the brushes 48 and 50, and 49 and 50, while the voltage between brushes 48 and 50 is at all times constant. This type of welding generator is disclosed in Letters Patent of the United States to Sven R. Bergman, No. 1,340,004, May 11, 1920.

Fig. 4 represents a practical embodiment of my preferred type of welding aparatus. The welding apparatus is herein represented as mounted upon a pedestal 60, a hand-wheel 61 and gear arrangement 62 being provided for adjusting the welding apparatus to any desired elevation. A hand-wheel 63 cooperating with a worm 64 and worm-wheel 65 is provided for adjusting the welding apparatus to any desired position in a horizontal plane. It is apparent, however, that the vertical and horizontal adjusting mechanism comprising hand-wheels 61 and 63 may be omitted if desired. The welding apparatus comprises a supporting frame 66, shown secured by bolts 67 to the member 68 of the supporting pedestal. The welding apparatus is insulted from the supporting pedestal preferably by an insulating member 69. The supporting frame 66 is provided with a rotatably adjustable, laterally projecting member 70 upon which the welding head 71 is adjustably mounted. The member 70 is secured to or made integral with a member 72 provided with a circular projection seated in a bearing in the frame member 66. The member 72 is clamped firmly in place against the frame 66 by means shown as bolts 73. Upon loosening bolts 73 the member 72 with its projecting arm 70 may be rotatably adjusted to vary the angular position of the welding head, as hereinafter set forth. Stop devices, one of which is shown at 74 in the drawing, are provided to limit the rotatable adjustment that may be imparted to the member 72. The welding head 71 is adjustably supported upon a member 75 by means shows as bolts 76 provided with T-heads working in a slot 77 in the member 75. But one of these bolts 76 may be seen in Fig. 4, although a similar bolt is used on each side of the welding head. It is apparent that by loosening the bolts 76, the welding head may be rotatably adjusted in a plane at right angles to the adjustment that may be secured by loosening bolts 73. The position of the welding head 71 along the projecting arm 70 may be varied by means of the hand wheel 78, which operates screw 79 which engages a threaded member 80 secured to the plate 75 upon which the welding head is mounted. Guide plates 81 are secured to the projecting member 70 to provide ways along which the welding head may be adjusted by the hand wheel 78. The welding electrode 1 is fed through the welding head 71 by means of feed rolls 9 and 10, shown in Figs. 1 and 5. The electrode is fed from any conveniently located reel over the curved guide 83, which is pivotally mounted upon the welding head at 84 to permit the welding head to be adjusted to any desired position without moving the reel from which the electrode is uncoiled as welding proceeds. The electrode is arranged to pass through straightening rolls 85 arranged in planes at right angles to each other, one set only of these straightening rolls being clearly shown in Fig. 4. The welding head 71 is preferably provided with radiating plates 86 for shielding the welding head from the heat of the work and welding arc. A non-combustible fabric or plate 87 may also be secured to the welding head if desired. It will be observed that the welding head of Fig. 4 is supported on an arm projecting laterally from the supporting frame and pedestal, thereby facilitating the introduction of the work under the welding head. It is obvious that any convenient means may be provided for traversing the work under the welding head. It is also apparent that, if desired, the welding apparatus with its pedestal may be located, so that the projecting arm extends over an ordinary lathe-bed in which case the lathe mechanism may be used to traverse the work, either by motion of translation or rotation as desired.

Power is transmitted to the welding head of Fig. 4 from motor 11 mounted on the supporting frame 66. The gearing arrangement will be readily understood from Fig. 5. The motor 11 drives a worm 88, which drives a worm-wheel 89 upon the shaft of which a worm 90 is mounted. Worm 90 drives worm-wheel 91 upon the shaft of which a spur-gear 92 is mounted. Gear 92 engages an idler 93 which drives gear 94 mounted on the shaft 95, which transmits power to the feed roll 10. The arrangement of gears 92, 93 and 94 is such that the gear ratio may be changed to adjust the rate of electrode feed as may be necessary when the size of electrode or welding current is changed. By thus adjusting the gear ratios, the amount of work required of the automatic regulating means for the motor 11 may be reduced below what would be required without such adjustment and the regulation kept more nearly within the range of maximum sensitiveness. Shaft 95 transmits power through a feather 96 to a bevel gear 97 which slides along shaft 95 when the welding head is adjusted in position by means of hand-wheel 78. Bevel gear 97 transmits power to a bevel gear 98 mounted on the shaft 99, at right angles to shaft 95, which carries feed roll 10. Gears 100 and 101 are provided to insure that feed rolls 9 and 10, shall rotate in opposite directions at the same speed. A hand-wheel 102 is provided to enable the feed rolls to be operated manually when desired. To permit of such manual operation, it is merely necessary to move the idler 93 out of mesh with gear 92. Such manual operation may be desirable, for example, where the electrode is being threaded through the machine. A gear 103 cooperating with gears 104 and 105 is ararnged to vary the position of the bearings of feed roll 9 slightly to accommodate different sizes of electrodes and vary the pressure with which the feed rolls engage the electrode. Current is preferably conducted to the electrode by means of a brush 14 bearing on one of the feed rolls 9 or 10 as shown in Figs. 1 and 4.

The mode of operation of the apparatus shown in Fig. 5 is believed to be clear from the description of the structure thereof. It is apparent that by loosening the bolts 73, the angle at which the electrode is delivered from the welding head 71, may be rotatably adjusted in one plane, and that by loosening the bolts 76 the angle at which the electrode is delivered may be rotatably adjusted in a plane at right angles to this plane. It is furthermore apparent that the distance of the welding head from the support may be adjusted by the hand-wheel 78 and screw 79, and that where hand-wheels 63 and 61 are used, the welding apparatus may be adjusted in any desired elevation and to any desired position around the supporting pedestal 60. It is extremely desirable to be able to adjust the angle at which the electrode is delivered, since this is frequently necessary in order to get into corners, and also is necessary where the apparatus is used to build up shafts by welding a strip of metal thereon, while the shaft is simultaneously rotated and traversed with respect to the welding head. I am enabled to secure the rotatable angular adjustments referred to, by reason of the fact that the bearing for the rotatable plate 72 is made concentric with the axis of shaft 95, and the axis of the rotatable adjustment of the head 71, with respect to the member 75, is made concentric with the axis of shaft 99 through which power is transmitted from the gear 98 to the feed rolls 9 and 10. It is thus apparent that the angular adjustments, as well as the lateral adjustment of the welding head along the projecting arm 70, are secured without interfering with the operation of the power transmitting mechanism connecting the motor 11 to the electrode feed rolls.

In accordance with the provisions of the patent statutes, I have described the principle of operation of my invention together with the apparatus which I now consider to represent the best embodiment thereof, but it is apparent that modifications and variations are possible within the scope of my invention, and I, therefore, desire in the appended claims to cover all such modifications and variations as fall within the spirit of my invention.

What I claim as new and desire to secure by Letters Patent of the United States is:—

1. An automatic arc welding machine of the type employing a metallic electrode comprising a support, a welding head mounted on said support including means adapted to guide a welding electrode through said head to the work to be welded, and means whereby said welding head may be angularly adjusted with respect to said support in two planes of adjustment at right angles to each other whereby the electrode may be delivered from the welding head at any desired angle.

2. An automatic welding machine of the type employing a metallic electrode comprising a supporting frame, a member mounted on said supporting frame and projecting laterally therefrom, a welding head comprising electrode feed mechanism mounted on said projecting member, means whereby the position of the welding head may be adjusted along the projecting member, a motor mounted on said supporting frame and means for transmitting power from said motor to said feeding mechanism, comprising a shaft extending along said projecting member, said projecting member being constructed and arranged to be rotatably adjusted about the axis of said shaft whereby the distance of the welding head from the supporting frame and the angular position of the welding head with respect to the work may be adjusted without disturbing the power transmission between the motor and electrode feeding mechanism.

3. An automatic arc welding machine of the type employing a metallic electrode comprising a supporting frame, a member mounted upon and projecting laterally from said supporting frame, a welding head comprising electrode feeding mechanism mounted upon said laterally projecting member, mechanism arranged to transmit power from a motor adapted to be located on said supporting frame to said electrode feeding mechanism in said welding head, comprising a shaft extending along said projecting member and a shaft at right angles to said projecting member, means whereby said projecting member may be adjusted about the axis of said first shaft to vary the angular position of the welding head in one plane, and means whereby the welding head may be adjusted about the axis of said shaft at right angles to the first shaft whereby the angular position of the welding head may be adjusted in another plane.

4. In an arc welding machine, a head comprising electrode feeding mechanism, electrode straightening rolls mounted on said head, means for adjusting the position of said head and guiding means pivotally mounted on said head arranged to guide the electrode to said straightening rolls.

5. An arc welding system comprising mains adapted to be connected to a welding circuit and arranged to deliver a voltage decreasing with increasing welding current, and comprising mains adapted to deliver a substantially constant voltage, electrode feed mechanism, an electric motor for operating said mechanism to draw and regulate the welding arc and means arranged to connect said motor across said welding circuit mains when the voltage at the arc is above a predetermined value for operation in a direction to feed the electrode toward the work and to connect said motor in series with the welding electrodes to said constant voltage mains for operation in a direction to separate the electrode from the work when the voltage of the arc is below a predetermined value.

6. An arc welding system comprising positive and negative constant potential mains and a third main between which and said positive main a welding circuit is adapted to be connected, and wherein the voltage between said third main and the negative main varies inversely with the voltage of the welding circuit mains, and wherein mechanism is arranged to feed a welding electrode toward the work as it is consumed, and wherein an electric motor is arranged to operate said electrode feed mechanism, characterized by the fact that means are provided to connect said motor across the welding circuit to feed the electrode toward the work when the arc voltage is above a predetermined value and to connect said motor between said third main and negative main for operation in the reverse direction to strike the arc when the voltage across the arc corresponds to a short-circuit of the arc.

7. An arc welding system comprising positive and negative constant potential mains and a third main between which and said positive main a welding circuit is adapted to be connected, and wherein the voltage between said third main and the negative main varies inversely with the voltage of the welding circuit mains, and wherein mechanism is arranged to feed a welding electrode toward the work as it is consumed, and wherein an electric motor is arranged to operate said electrode feed mechanism, characterized by the fact that one terminal of said motor is connected to said third main and the fact that means responsive to the arc voltage are provided to connect the other terminal of said motor either to the positive or negative constant potential mains according to whether the voltage across the welding circuit is above or below a predetermined value, whereby the motor will operate to feed the electrode toward and away from the work to strike the arc and whereby the speeds of operation in the respective directions are independent.

8. An arc welding system comprising a welding circuit adapted to deliver a current of a suitable characteristic for welding, a supply circuit adapted to deliver a substantially constant voltage, electrode feed mechanism, an electric motor for operating said mechanism to draw and regulate the welding arc, means arranged to connect said motor across said welding circuit, when the voltage is sufficient for welding, for operation in a direction to feed the electrode toward the work and to connect said motor for operation from said supply circuit for operation in a direction to separate the electrode from the work, when the voltage of the arc is below that sufficient to weld, and means for regulating the field strength of said motor in accordance with a function of the energy at the arc to assist in regulating the rate of electrode feed to maintain the arc at constant length and means for affecting said regulating means to cause the same to strengthen the motor field when the welding circuit is interrupted, whereby a strong motor field is obtained for the restarting operation.

9. An arc welding system comprising but three mains two of which are adapted to be connected to a source of substantially constant potential direct current, one of said constant potential mains being arranged to be connected to the work to be welded, electrode feeding mechanism electrically connected to said third main, said third main and work main being adapted to be connected to a source of E. M. F. suitable for arc welding, an electric motor arranged to operate said mechanism to draw and regulate the welding arc, a contactor connected to respond to arc voltage arranged to connect said motor across the welding arc to feed the electrode toward the work when the arc voltage is above a predetermined amount and to connect said motor to receive current from said constant potential mains to reverse the direction of electrode feed to strike the arc when the arc voltage falls below a predetermined value, connections for exciting the motor field circuit from said constant potential mains, means for controlling the motor field strength in accordance with the value of the arc voltage to maintain the arc at substantially constant length during welding, a contactor for opening and closing the welding circuit and connections for operating said contactor connected across said constant potential mains, whereby the system may be connected for operation from any suitable supply circuit with the same connections of the control and regulating circuits.

10. In an electric arc welding apparatus wherein a fusible electrode is fed to the work as it is consumed, feed rolls arranged to engage said electrode to drive the same positively, a reversible electric motor arranged in positive driving relation with said feed rolls and means connected to be responsive to arc voltage arranged to connect said motor across the arc for operation in a direction to feed the electrode toward the work when the arc voltage is above a predetermined value, and to connect said motor across another source of E. M. F. for reverse operation to feed the electrode away from the work to draw the welding arc when the arc becomes short-circuited.

11. An electric arc welding system comprising means for feeding a fusible welding electrode to the work at a rate depending upon a function of the energy at the arc and comprising an electric motor arranged to cause a motion of traverse between the work and the electrode characterized by the fact that means connected to respond to arc voltage are provided for completing operating and braking circuits for the traversing motor according to whether the arc voltage is equal to or less than a value sufficient for welding and by the fact that means connected to respond to arc voltage are provided to cause said circuit completing means to remain in the braking position when the arc voltage is above a predetermined value.

12. An arc welding system comprising electrode feed mechanism, an electric motor arranged to operate said mechanism, means for regulating the field strength of said motor in accordance with the voltage at the arc to maintain the arc at constant length, an electric motor for causing a motion of traverse between the work and the fusible electrode, means for completing operating and braking circuits for the traversing motor according to whether the arc voltage is equal to or less than a value sufficient for welding, and means connected to be responsive to arc voltage for controlling said field strength regulating means and said traversing motor circuit completing means to strengthen the field of said electrode feed motor and complete the braking circuit for said traversing motor when the arc voltage exceeds a predetermined value.

In witness whereof, I have hereunto set my hand this 24th day of April, 1920.

PAUL O. NOBLE.